Patented Aug. 5, 1952

2,606,209

UNITED STATES PATENT OFFICE 2,606,209

4,4-DI(CHLOROMETHYL)-2-PENTANONE

Kenneth E. Wilzbach, Chicago, Ill., assignor to United States Rubber Company, New York, N. Y., a corporation of New Jersey No Drawing. Application December 14, 1948, Serial No. 65,289

1 Claim. (Cl. 260—593)

This invention relates to a new chemical, denoted 4,4-di(chloromethyl)-2-pentanone, subscribing to the formula

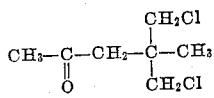

The chemical can be prepared by reacting 2-methyl-4,4-di(chloromethyl)-1-pentene (dimer of methylallyl chloride) with an oxidizing agent, e. g., oxygen, ozone, permanganate salts such as potassium permanganate, the latter being preferably employed in acid solution. The ozonolysis proceeds readily at 0° C. and is complete within a few hours, say 3 hours, whereas the oxidation by permanganate is completed within 24 hours at about 25° C. In both cases, there are obtained high yields of the 4,4-di-(chloromethyl)-2-pentanone, which is isolated and purified by extraction and subsequent fractional distillation.

This new compound is of particular utility as a synthetic intermediate. For example, upon reaction with alkali it is readily converted to 1-acetyl-2-methyl-2-chloromethylcyclopropane.

The following examples disclose my invention in more detail.

Example 1

Seven grams of 2-methyl-4,4-di(chloromethyl)-1-pentene are dissolved in 100 ml. of commercial 90% formic acid and a stream of oxygen containing 6% of ozone is introduced into the solution at 0° C. at a rate of 140 ml./minute for a period of 3 hours. The solution is then diluted with 50 g. of water, neutralized with aqueous alkali, and extracted with diethyl ether. The extract is dried and fractionally distilled to yield about 6.5 g. of 4,4-di(chloromethyl)-2-pentanone, B. 74–75° C./3 mm; $n_D^{20}$ 1.4705; sp. gr. (20/20) 1.159.

| Analysis | Percent Carbon | Percent Hydrogen | Percent Chlorine |
|---|---|---|---|
| Found | 45.80 | 6.73 | 38.88 |
| Theory | 45.88 | 6.61 | 38.70 |

The 2,4-dinitrophenyl hydrazone of the new compound melts at 88° C.

Example 2

A solution of 25 g. of potassium permanganate and 17 g. of concentrated (96%) sulfuric acid in 250 g. of water is gradually added in the course of 24 hours to an agitated suspension of 8.5 g. of 2-methyl-4,4-di(chloromethyl)-1-pentene in 50 g. of water at 25° C. After the permanganate solution has been decolorized the manganese dioxide formed is removed by filtration and the filtrate is extracted with diethyl ether. The extract is dried and fractionally distilled to yield 6.0 g. of 4,4-di(chloromethyl)-2-pentanone.

Having thus described my invention, what I claim and desire to protect by Letters Patent is:

As a new compound, 4,4-di(chloromethyl)-2-pentanone.

KENNETH E. WILZBACH.

REFERENCES CITED

The following references are of record in the file of this patent:

UNITED STATES PATENTS

| Number | Name | Date |
|---|---|---|
| 2,004,066 | Whitmore et al. | June 4, 1935 |
| 2,338,893 | Bauer et al. | Jan. 11, 1944 |

OTHER REFERENCES

Wilzbach, Mayo and VanMeter: J. Am. Chem. Soc., vol. 70, pages 4069–4072 (1948).